(No Model.)
H. C. PRICE.
PHOTOGRAPHIC CAMERA.
No. 260,235. Patented June 27, 1882.
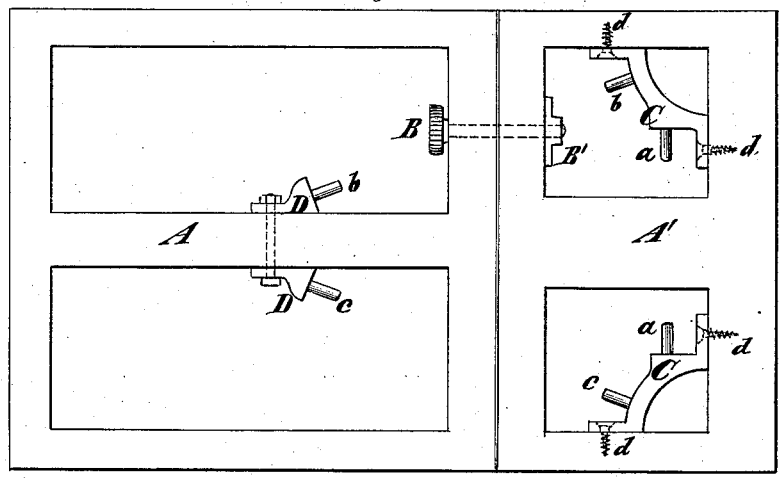
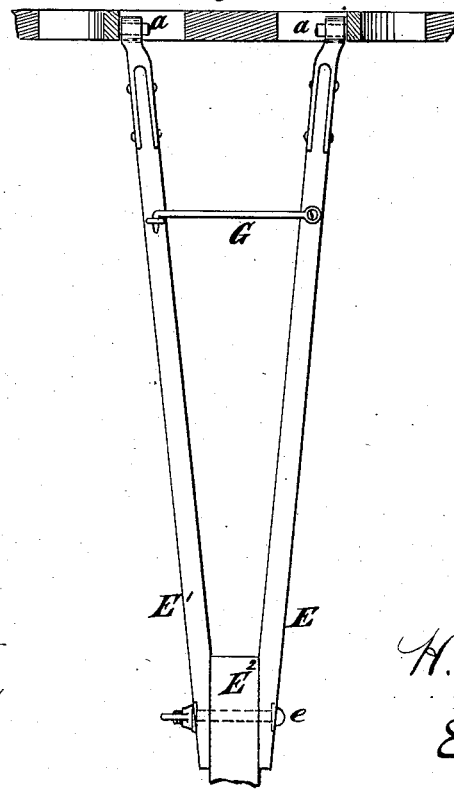
Witnesses
T. J. Keane
James R. Bowen
Inventor
H. Clay Price
By his Atty.
Edwin H. Brown

UNITED STATES PATENT OFFICE.

H. CLAY PRICE, OF MONTCLAIR, NEW JERSEY, ASSIGNOR TO THE SCOVILL MANUFACTURING COMPANY, OF WATERBURY, CONNECTICUT.

PHOTOGRAPHIC CAMERA.

SPECIFICATION forming part of Letters Patent No. 260,235, dated June 27, 1882.

Application filed January 11, 1882. (No model.)

*To all whom it may concern:*

Be it known that I, HENRY CLAY PRICE, of Montclair, in the county of Essex and State of New Jersey, have invented certain new and useful Improvements in Photographic-Camera Stands, of which the following is a specification.

The object of my present improvements is to conduce to the production of a very light and compact photographic camera convenient to be carried from place to place.

My improvements consist essentially in the combination, with a camera and detachable supporting-legs therefor, of devices, particularly hereinafter described and claimed, secured within and directly to the base-frame of the camera and provided with pivots to which the legs may be attached.

In the accompanying drawings, Figure 1 is a plan or top view of the bed or base-frame of a photographic camera embodying my improvements, and Fig. 2 is a side view of one of three legs which form the stand for such camera.

Similar letters of reference designate corresponding parts in both figures.

A A' designate the bed or base-frame of a photographic camera, which is, in fact, made in the form of a frame and is composed of two sections, A and A'. These sections are hinged together, so that when the frame is not in use one may be folded or swung out of line with the other to facilitate packing. A screw, B, passing through the meeting-rails and adapted to engage with a nut, B', serves as a means for holding them in line when extended for use.

Attached close to the two outer corners of the section A' of the base-frame, but within the same, are two devices, C, which are severally provided with lugs, and are preferably made of metal. They are provided each with a lug or pivot, $a$, and these two lugs extend toward each other. One is also provided with a similar lug or pivot, $b$, and the other with a lug or pivot, $c$. The lugs $b$ and $c$ extend at corresponding angles to the lugs $a\ a$.

Attached one on each side of the center rail of the section A of the base-frame are two devices, D, one of which has a lug or pivot, $b$, which extends toward the lug or pivot $b$ of one of the devices C, and the other of which has a lug or pivot, $c$, which extends toward the lug or pivot $c$ of the other device C. The devices C may be secured in place by nails or tacks $d$ or otherwise, and the two devices D may be secured in place by a single bolt passing through them and the center rail of the section A of the base-frame and a nut applied to the bolt. It will be observed that they do not project above or below the base-frame.

The stand is composed of three legs like the one shown in Fig. 2. Each consists of three pieces, $E\ E'\ E^2$, secured together near the ends by a hinge-pin, $e$. When the legs are not in use these three pieces may be swung into parallel positions, so as to be compact enough for convenient transportation; but when in use the middle piece may be swung out into line with the others and clamped in position by a screw-thread on the hinge-pin and a nut applied thereto, or otherwise. The middle piece has a pin on the end, which may be driven into the ground. The other pieces are provided at the upper ends with eyes which can be fitted to the lugs or pivots $a\ b\ c$ when said pieces are sufficiently spread apart at the upper ends. After being thus spread apart they may be secured in position by a cross-brace, G. One leg is thus fitted directly to the lugs or pivots $a\ a$, another to the lugs or pivots $b\ b$, and a third to the lugs or pivots $c\ c$. The legs may then be swung apart on the lugs or pivots suitably to afford the camera a stable support even on uneven ground.

It will be seen that by my improvements I materially simplify and reduce the bulk of a photographic apparatus, because I dispense with the plate which is usually employed between the camera and its supporting-legs.

What I claim as my invention, and desire to secure by Letters Patent, is—

1. The combination, with a camera and detachable legs therefor, of the devices C, secured within and directly to the base-frame, and provided with the pivots $a$, substantially as specified.

2. The combination, with a camera and detachable legs therefor, of the devices C and D, secured within and directly to the base-frame, and provided with pivots $a$ and $b$ or $c$, substantially as specified.

H. CLAY PRICE.

Witnesses:
T. J. KEANE,
JAMES R. BOWEN.